March 27, 1951 H. HANSEN 2,546,821

MAGNETIC RECORDER AND REPRODUCER

Filed Dec. 18, 1948

INVENTOR
H. HANSEN
BY [signature]
ATTORNEY

Patented Mar. 27, 1951 2,546,821

UNITED STATES PATENT OFFICE 2,546,821

MAGNETIC RECORDER AND REPRODUCER

Harry Hansen, Clifton, N. J., assignor to Bell Telephone Laboratories, Incorporated, New York, N. Y., a corporation of New York Application December 18, 1948, Serial No. 66,091

6 Claims. (Cl. 177—380)

Figure 1:
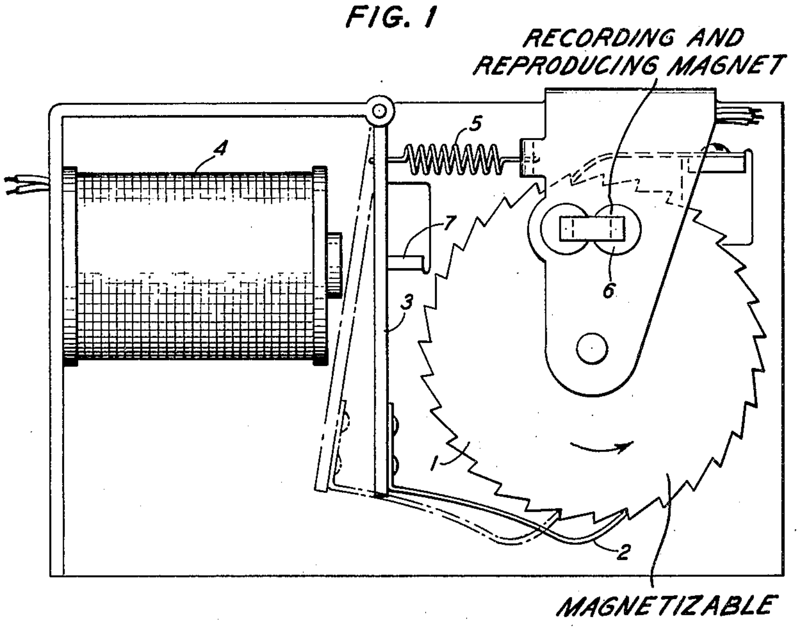

This invention relates to magnetic recorders and reproducers.

While magnetic recorders have been most extensively used for the recording and reproducing of voice and music, they are also useful and widely used for recording and reproducing discrete signals for various purposes. In the latter type of magnetic recording, the recording magnets may be energized with direct current and the magnetic medium may be stationary during the recording of the signals and moved only between recordings. The same magnet that was used to record the signals may also be used to reproduce them but, for reproduction, the recorded signals must be moved past the poles of said magnet with some velocity to induce detectable voltages in the windings of said magnet.

The present invention discloses a novel and unusually simple and inexpensive form of magnetic recorder for these purposes. A feature of the invention is that recorded signals are reproduced without changing the position of the recording and reproducing magnet nor the arrangement for advancing the recording medium.

Figure 2:
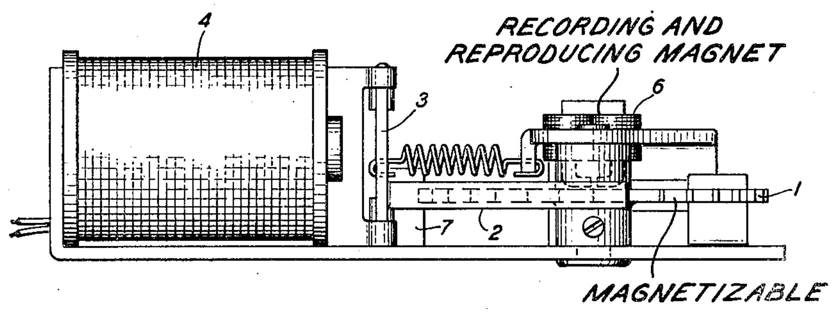

The features of the invention, its construction, and its operation will be apparent from the accompanying description, the appended claims, and the drawing in which:

Fig. 1 shows a front view of one embodiment of my magnetic recorder and reproducer; and Fig. 2 shows a side view of said device.

Referring to the drawing, the magnetic medium 1 of my recorder and reproducer is a disc of magnetic material having ratchet teeth on the edge thereof. The teeth are engaged by the spring pawl 2 carried by the armature 3 of the magnet 4. Said armature is held in its normal position against the stop 7 by the spring 5 and the movement allowed said armature when magnet 4 is energized is sufficient to pass the pawl 2 over two of the teeth of the disc 1, as indicated in the drawing by dotted lines. The recording and reproducing magnet 6 is mounted in any suitable manner with its poles close to or in contact with the surface of the disc 1.

In operation magnet 6 is momentarily energized by any suitable means, such as a battery, recording a magnetic signal on the disc 1 at a point adjacent to the poles of said magnet. Magnet 4 is then energized by any suitable means, attracting its armature 3 which draws pawl 2 over two of the teeth of disc 1. Magnet 4 is then deenergized and the spring 5, through the pawl 2, advances the disc 1. Again energizing magnet 6 records another signal at another point on the disc 1. Signals may thus be recorded in a circular path on disc 1 during a revolution of said disc.

In my invention, however, the number of teeth on the disc 1 is an odd number, and at each operation of the magnet 4, the pawl 2 trasverses two teeth. Continued energization and deenergization of the magnet 4 after the disc 1 has completed one revolution brings the poles of the magnet 6, at each step of the disc 1 thereafter, halfway between the positions of the signals recorded on the first revolution of the disc 1. During the second revolution of the disc 1, therefore, each recorded signal passes the poles of the magnet 6 at speed, inducing voltage in the winding of said magnet, which may be detected by well-known means, such as a galvanometer or other suitable indicating device, thereby reproducing the signals.

An erasing magnet may be arranged, if desired, adjacent to magnet 6 and suitably energized by the usual means during the second revolution of disc 1 to erase the recorded signals after they have been reproduced so that a new set of signals may be recorded over the same circular path of the disc 1 on the next revolution of the latter and reproduced on its succeeding revolution.

While only one recording and reproducing magnet 6 has been shown, it is obvious that a plurality of recording and reproducing magnets, and erasing magnets also if desired, may be arranged to record on different circular paths of disc 1. The recording medium 1 may be in the form of a disc, as shown, or in the form of a drum or in any other suitable form. Other modifications which may be employed will be apparent to those skilled in the art.

The terms and expressions which I have used in reference to my invention are used as terms of description and not of limitation and I have no intention by the use of said terms and expressions of excluding thereby equivalents of the features shown and described or portions thereof, but, on the contrary, intend to include any and all equivalents or modifications which may be employed without departing from the spirit of the invention.

What is claimed is:

1. A magnetic recorder and reproducer comprising in combination a rotatable magnetizable medium having a plurality of stationary recording positions, means for recording magnetic signals on said medium at said recording positions, and means for rotating said medium to each of said recording positions during one revolution of said medium and to positions intermediate to said recording positions during the succeeding revolution of said medium, thereby to cause said recorded signals on said medium to pass under said recording means during said succeeding revolution.

2. In a magnetic recorder and reproducer, the combination recited in claim 1 in which said medium-rotating means comprises a circular array of an odd number of teeth on said medium and includes means for rotating said medium in steps of two of said teeth.

3. In a magnetic recorder and reproducer, the combination recited in claim 1 in which said magnetic medium is a disc of magnetizable material having an odd number of teeth around the periphery thereof, and said medium-rotating means comprises a pawl engaging said teeth and includes means for actuating said pawl to rotate said disc in steps of two of said teeth.

4. A magnetic recorder and reproducer comprising in combination a rotatable magnetizable medium, means for rotating said medium, means including a recording magnet for recording equiangularly spaced magnetic signals on said medium during one revolution thereof, said medium rotating means comprising means for traversing said signals past said magnet during the succeeding revolution of said medium.

5. A magnetic recorder and reproducer as set forth in claim 3 in which said medium-rotating means comprises a circular array of an odd number of teeth on said medium and includes means for rotating said medium in steps of two of said teeth.

6. A magnetic recorder and reproducer as set forth in claim 4 in which said magnetic medium is a disc of magnetizable material having an odd number of teeth around the periphery thereof and said medium-rotating means comprises a pawl engaging said teeth and includes means for actuating said pawl to rotate said disc in steps of two of said teeth.

HARRY HANSEN.

REFERENCES CITED

The following references are of record in the file of this patent:

UNITED STATES PATENTS

| Number | Name | Date |
| --- | --- | --- |
| 2,080,100 | Tauschek | May 11, 1937 |
| 2,307,965 | Shepherd | Jan. 12, 1943 |